July 19, 1966    F. GUICHENEY    3,261,122
HANDLING DEVICES FOR FISHING NETS
Filed June 15, 1964    5 Sheets-Sheet 1

Inventor:
François Guicheney
By: Spencer & Kaye
ATTORNEYS

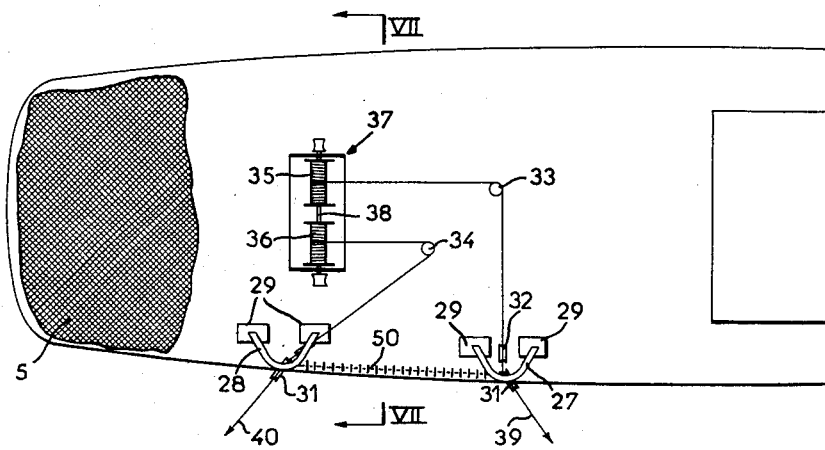
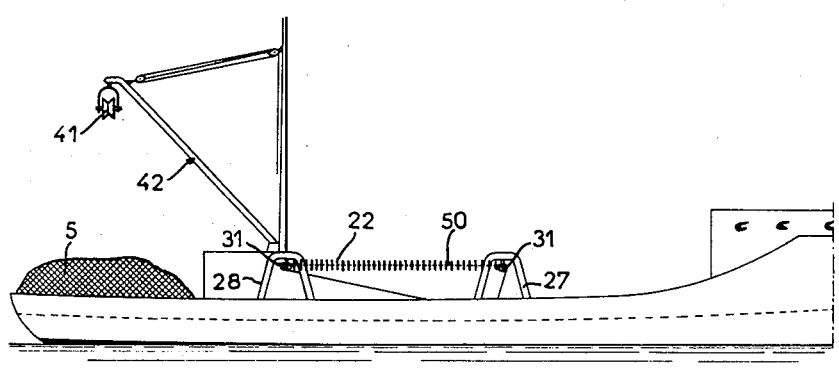
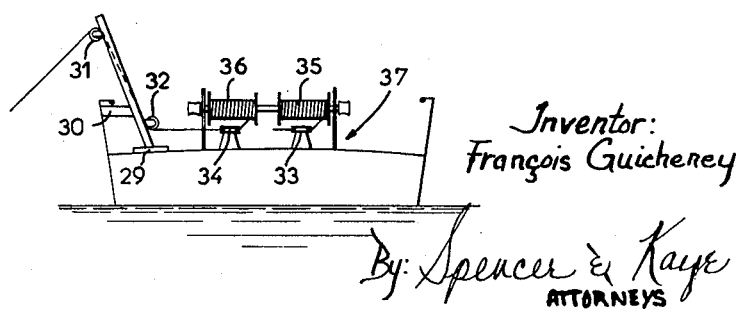

July 19, 1966 F. GUICHENEY 3,261,122
HANDLING DEVICES FOR FISHING NETS
Filed June 15, 1964 5 Sheets-Sheet 4
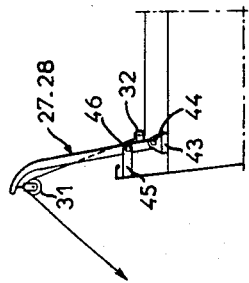
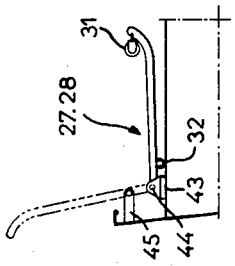
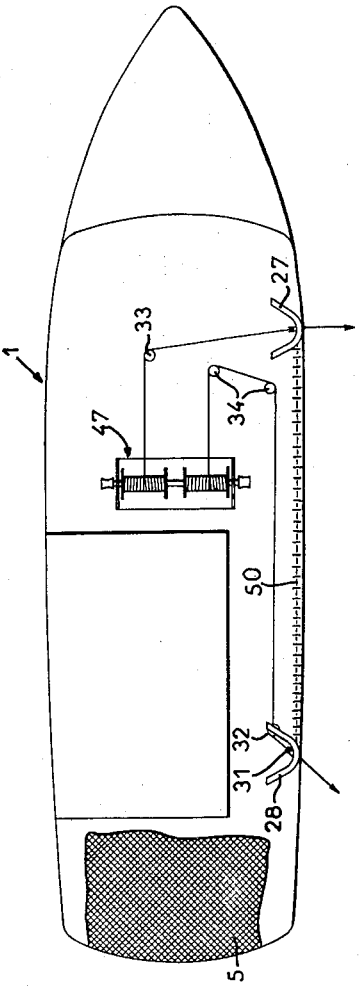
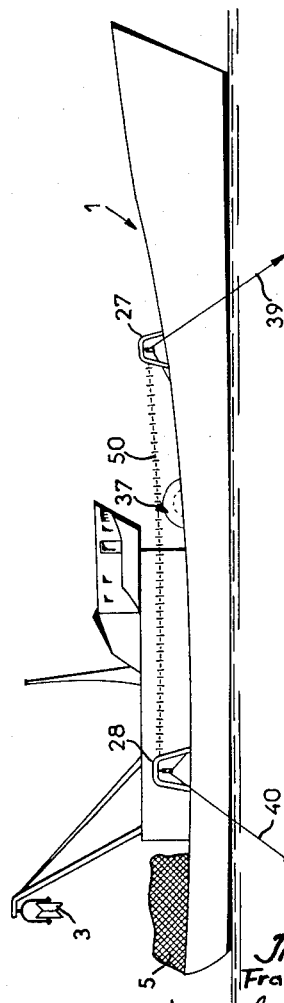
Inventor:
François Guicheney
By: Spencer & Kaye
ATTORNEYS July 19, 1966   F. GUICHENEY   3,261,122
HANDLING DEVICES FOR FISHING NETS
Filed June 15, 1964   5 Sheets-Sheet 5

Inventor:
François Guicheney
By: Spencer & Kaye
ATTORNEYS

United States Patent Office 3,261,122
Patented July 19, 1966

3,261,122
HANDLING DEVICES FOR FISHING NETS
François Guicheney, La Rochelle, France, assignor to Ateliers & Chantiers de la Manche, Lille, Nord, France, a corporation of France
Filed June 15, 1964, Ser. No. 375,109
Claims priority, application France, June 21, 1963, 938,894
3 Claims. (Cl. 43—8)

The present invention relates to operating devices for a rotating fishing net or seine net, employed more particularly in fishing for tunny fish, of the type comprising a draw-cable which is engaged in a series of rings on the edge of the net, and which is guided on each side of the said series of rings by two pulleys close to the ship's side, before being wound on winches.

The dimensions of these rotating nets may be as much as one thousand meters in length by a hundred meters in height and for this reason their weight is very considerable, for example of the order of several tons. The handling of such nets thus requires a special adaptation of the ship.

The devices employed at the present time for handling these nets are essentially composed: of a winch, the drums of which serve for the winding of the closure draw-line of the net; of a jib for guiding this draw-line known as a davit, receiving the two pulleys referred to above and located close to the ship's side and facing opposite the winch, and load-masts provided in the lower part of the ship and used for the purpose of various operations.

Such known devices are not very practical and are furthermore very expensive when it is desired to convert a trawler to a seining ship. In addition, at the end of the drawing operation, the drawing-rings hang over several meters below the davit, the pulleys of which are very close to each other, and along the hull of the ship, creating an outlet in the net through which the fish may escape.

The bringing of these rings on board in order to unhook them from the net for the purpose of the subsequent operations is effected by means of the topsides of the ship through the intermediary of a load-mast provided for that purpose. This operation is rendered delicate and complicated by reason of the considerable weight carried by the load-mast and resulting from the weight of the rings and in part from the weight of the net.

The present invention has for its object improvements in handling devices for fishing nets such as rotating seine nets of the type referred to above, which obviate these various drawbacks and which permit simple and rapid handling with a convenient and robust construction.

According to the invention, the two pulleys, instead of being brought close together on the same davit are respectively mounted on two separate davits mounted at a distance from each other.

By virtue of this arrangement, the lifting of the drawing-rings can be carried out directly at the right height for unhooking, above the ribband of the ship or above the deck. In addition, this arrangement permits for the lifting of the net, the utilization of the usual type of trawler winch with drums side by side, or any other winch of simple construction. This arrangement also permits the load-mast for lifting the rings to be dispensed with.

The characteristic features and advantages of the invention will furthermore be brought out in the description which follows below, given by way of example, reference being made to the accompanying drawings, in which:

FIG. 4 is a diagrammatic view of a rotating net or seine net.

FIGS. 5 and 6 are diagrammatic views showing respectively in plan and in elevation the rear part of a seining ship, having a deck equipment in conformity with the present invention.

FIG. 7 is a view in cross-section taken along the line VII—VII of FIG. 5.

FIGS. 8 and 9 show in elevation the two positions of an articulated davit.

Figure 10:
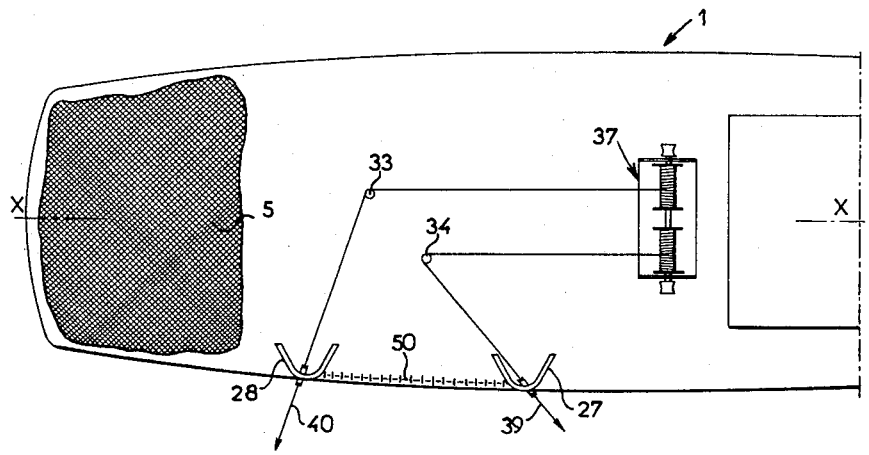
Figure 11:
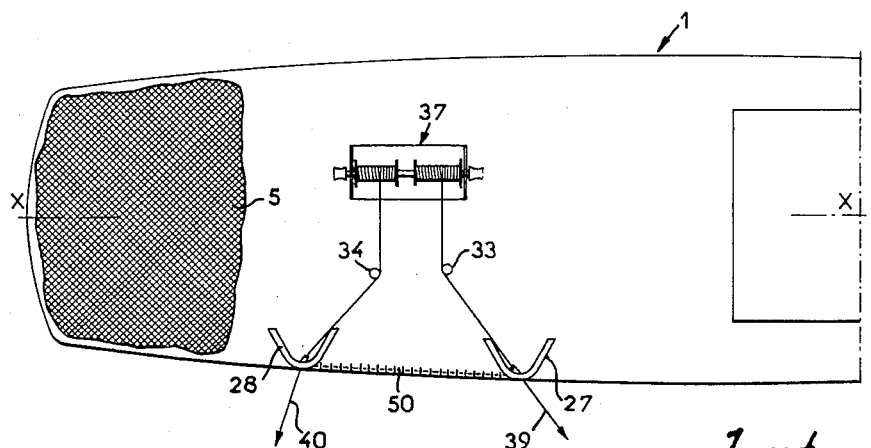

FIGS. 10 and 11 relate respectively to two alternative forms of construction.

FIGS. 12 and 13 show a further alternative form diagrammatically in plan and in elevation.

Figure 1:
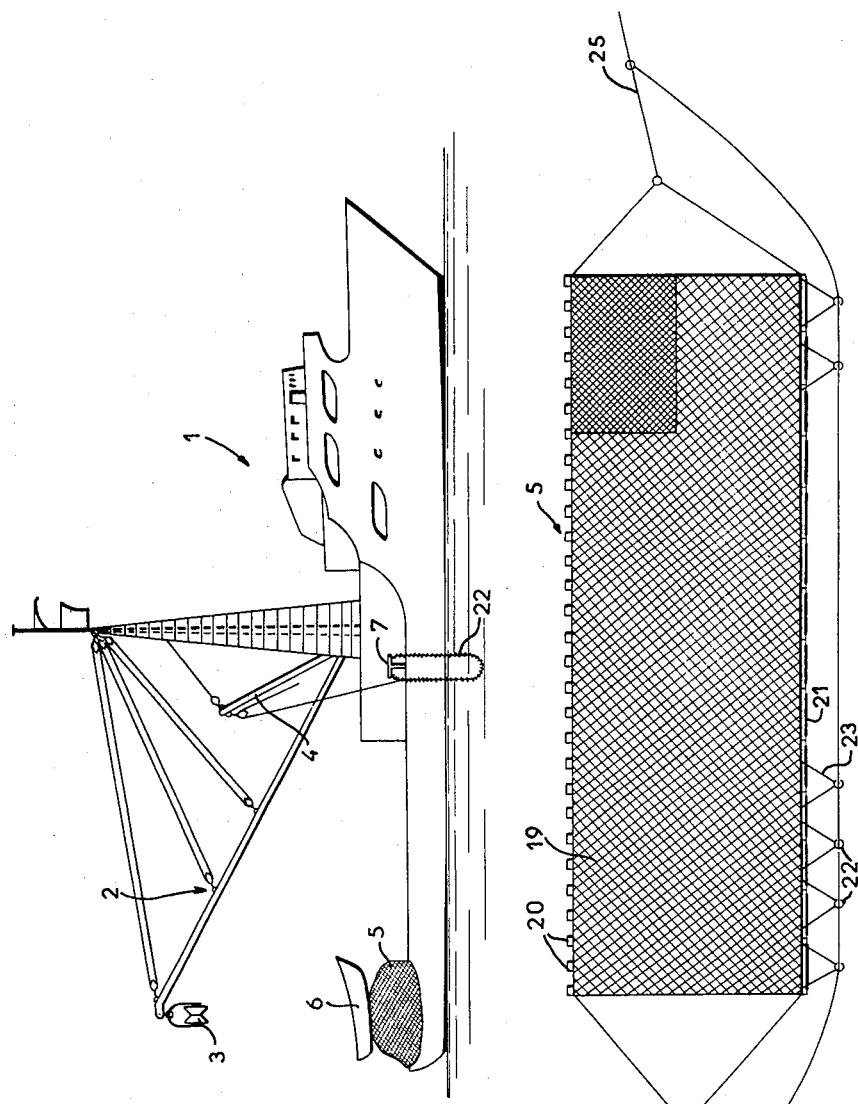
FIG. 1 is a view in elevation of a seining ship equipped in the usual manner.
Figure 2:
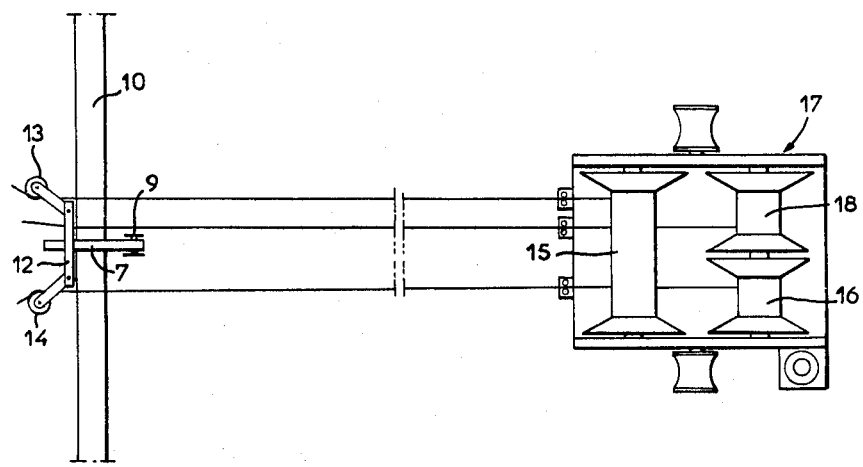
FIGS. 2 and 3 show respectively in plan and in elevation the arrangement of the winch and of the davit with which such a seining ship is equipped.
Figure 3:
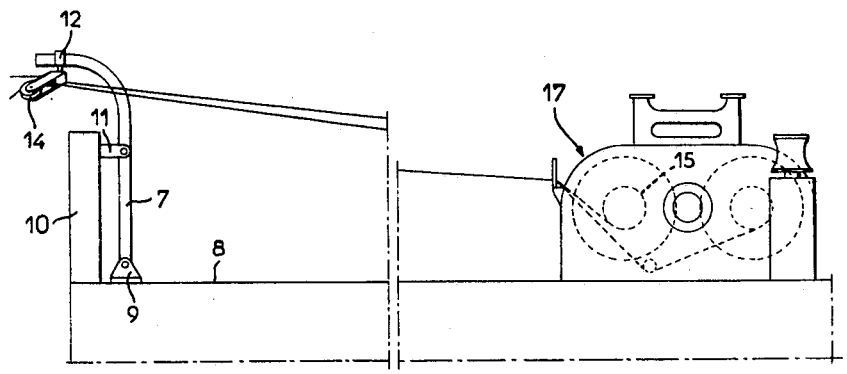

Reference will first be made to FIGS. 1 to 3, in which a ship 1 equipped in the usual manner for tunny fishing with a rotating seine, comprises a long load-mast 2, the extremity of which carries a driving pulley 3. A second load-mast 4 is also provided in the lower part of the ship. The rotating net or seine 5 is stacked in known manner on an area located to the rear of the ship, and may receive a ship's boat 6.

A davit or derrick 7 (FIGS. 1, 2 and 3) is fixed on the one hand to the deck 8 through the intermediary of a support 9 and on the other hand to the inner face of the bulwark 10 by means of a coupling member 11.

The davit 7 comprises at its upper part a support 12, the extremities of which carry two pivoted pulleys 13 and 14, over which pass the front and rear extremities of the draw-cable, these extremities being wound on the drums 15 and 16 of a winch 17 located facing the drawing-davit 7. A third drum 18 is also provided to serve for winding the arm of the rear wing of the seine. It should be observed that the two drums 15 and 16 serving for winding of the draw-cable are displaced one behind the other, and that their very different winding capacity requires that the total winding of the draw-line is always effected on the forward drum, the second only serving in principle for half the winding. A driving device (not shown in the drawings) ensures the control of the winch.

The seine net 5 (see FIG. 4) of generally rectangular shape, is constituted by a net 19 which comprises on one longitudinal edge a float-line 20, and on the opposite edge a lead-line 21. With this lead-line is associated a line or series of rings 22, through the intermediary of ring-ties 23. At each of its extremities, the net released in the water is connected to the ship by the cables 24 and 25 and by a draw-cable 26 engaged through the line of rings 22. When the operation of encircling the fish is completed, the closure of the seine is effected by tightening the draw-cable 26 actuated by the winch 17 through the closely-adjacent pulleys 13 and 14 on the same davit 7.

At the end of the drawing operation, the drawing-rings are brought together and hang (over a length which may reach several meters) externally under the davit 7, and along the bulwark (FIG. 1). The bringing into position on the deck of the ship of this line of rings by unhooking them, before engaging the extremity of the seine in the pulley 3 is effected from the topsides of the ship and through the intermediary of the auxiliary load-mast 4.

Reference will now be made to FIGS. 5 to 7 which illustrate a lifting device according to the invention, and in which, contrary to the usual arrangement described above, the line of rings is brought in directly at the right height for unhooking above the ribband of the ship.

The device according to the invention comprises essentially two davits 27 and 28, which may be constructed either separately or fixed together, widely spaced apart from each other and fixed to the ship, on the one hand to the deck by means of plates 29 and, on the other hand, to the inner face of the bulwark by means of bracing struts 30 (FIG. 7). Each of these davits carries at its upper portion an articulated pulley 31 (mounting on a swivel-block or any other device permitting angular movement), and towards their lower part, a so-called return pulley 32. Two pulleys 33 and 34 with vertical axes are fixed on the deck substantially opposite the drums 35 and 36 of a winch 37. The drums 35 and 36 have a common driving control (not shown) and are carried on the common shaft 38. The extremity of the front side of the draw-cable is guided and supported by the pulleys 31 and 32 of the front davit 27 and then round the vertical-spindle pulley 33 and is finally wound round the drum 35 of the winch, while the extremity of the rear side of this draw-cable passes over the rear davit 28, over the pulleys 31 and 42 of this davit and then round the pulley 34 and finally over the drum 36 of the winch.

During the drawing operation, the front and rear sides of the draw-cable occupy a position as indicated at 39 and 40 on FIG. 5. At the end of the drawing operation, the space formed between the two davits 27 and 28 enables the draw-cable carrying the line of rings (position shown in dotted lines and at 50 in the drawings) to be kept taut. This line of rings being thus brought in at a man's height, the unhooking of the rings then becomes quite easy. In addition, in order to put them on board, it is only necessary to let the draw-cable fall on the deck. When the unhooking of the rings has been completed, the extremity of the seine can be engaged on the driving pulley 41 mounted on the extremity of a load-mast 42, which may or may not be orientatable, situated directly above the stowage area for the seine net.

The operation of unhooking the rings could be still further facilitated by the use of davits with articulated fixing points, as shown in FIGS. 8 and 9. To this end, the lower extremity of each of the arms of the davits, for example having the same shape as those of the davits 27 and 28, is engaged in a forked member 43 fixed on the deck of the ship, and is coupled to this fork through the intermediary of a spindle 44. A bracing strut 45 fixed on the inner face of the ribband permits the davits to be held at will in the lifted position by means of a pin 46.

The unhooking of the rings is in this case carried out directly on the deck of the ship after the davits have been swung down on the deck, the pin 46 having been previously removed.

With such an arrangement of the drawing davits, the position of the winch can be chosen freely, especially as shown in FIGS. 10 and 11. The winch can be arranged either perpendicular to the longitudinal axis X—X of the ship (see FIG. 10) or parallel to that axis (see FIG. 11), the vertical return pulleys 33 and 34 being then suitably positioned in each of the above-mentioned cases.

According to a further alternative form of construction shown in FIGS. 12 and 13, the conversion of a trawler to a seiner only requires slight modifications, due mainly to the arrangement of the drawing davits 27 and 28, which permit the utilization of the trawler winch 47 through the intermediary of return pulleys 33 and 34, for lifting the drawing rings. This arrangement can also permit the equipment of a multi-purpose fishing ship which is simultaneously a trawler and a seiner, by means of a fairly simple adaptation of the trusses and the truss heads so as to permit a greater movement of the pulleys; the rear girder is also given a definite position so as to permit the net to be lifted by the driving pulley, etc.

The invention is of course not limited to the examples of construction selected and shown, which may on the contrary form the subject of various modifications, without thereby departing from the scope of the invention.

What I claim is:

1. A handling device for a seine fishing net having a series of drawing rings attached to the lower edge thereof and a draw cable slidably received by said rings comprising a pair of davits secured to a boat in spaced relation, a pulley secured to each of said davits, a pair of winch drums secured to said boat, each end portion of said draw cable on opposite ends of said series of rings being guidingly engaged on one of said pulleys and connected to a corresponding drum, said spacing between said davits being such that when said draw cable is drawn up taut between said davits by said drums said series of rings will be suspended in a straight line between said pulleys.

2. A handling device, as claimed in claim 1, in which said pair of winch drums are coaxial and are provided with a common rotational drive.

3. A handling device as claimed in claim 1, in which said pair of davits are pivotally mounted on said boat for movement toward the interior thereof, in order to facilitate the operation of unhooking said series of drawing rings.

References Cited by the Examiner
UNITED STATES PATENTS

| | | | |
|---|---|---|---|
| 712,370 | 10/1902 | Gaffney | 43—8 X |
| 753,168 | 2/1904 | Scott | 43—8 |
| 2,570,285 | 10/1951 | Sundberg | 43—8 |
| 3,006,097 | 10/1961 | Luketa | 43—8 |
| 3,091,880 | 6/1963 | Puretic | 43—8 |

ALDRICH F. MEDBERY, *Acting Primary Examiner.*

SAMUEL KORENS, *Examiner.*

W. H. CAMP, *Assistant Examiner.*